United States Patent [19]

Fischer

[11] 4,140,742
[45] Feb. 20, 1979

[54] METHOD FOR MAKING A GASKET FOR A CONTAINER CLOSURE

[75] Inventor: Robert P. Fischer, Lancaster, Pa.

[73] Assignee: Kerr Glass Manufacturing Corporation, Lancaster, Pa.

[21] Appl. No.: 796,010

[22] Filed: May 11, 1977

[51] Int. Cl.² ................... B29C 1/14; B29C 13/02
[52] U.S. Cl. ................................. 264/268; 264/331
[58] Field of Search .............. 264/268, 331, DIG. 67

[56] References Cited

U.S. PATENT DOCUMENTS

| 2,456,972 | 12/1948 | Maeder, Jr. et al. | 264/268 |
|---|---|---|---|
| 2,654,913 | 10/1953 | Maier | 264/268 |
| 3,125,459 | 3/1964 | Foye | 427/238 |
| 3,462,331 | 8/1969 | Simons | 264/268 |
| 3,557,030 | 1/1971 | Simons | 264/268 |

FOREIGN PATENT DOCUMENTS 807216  2/1969  Canada ................................. 264/268

*Primary Examiner*—James B. Lowe
*Attorney, Agent, or Firm*—Fitch, Even, Tabin & Luedeka

[57] ABSTRACT

A method for forming a gasket for a container closure. In the method, a dispersion of a finely powdered plastic resin in a fluid carrier is prepared and the viscosity of the dispersion is adjusted to provide desirable flow characteristics. The resin is not associated in the dispersion with a plasticizer. An annulus of the dispersion is applied to a container closure. The applied annulus of the dispersion is then subjected to an elevated temperature for a sufficient time to remove the carrier and to fuse the thermoplastic resin particles which are united to form a resilent seal.

9 Claims, No Drawings

METHOD FOR MAKING A GASKET FOR A CONTAINER CLOSURE

The present invention relates to the formation of sealing gaskets for container closures. More particularly, the present invention relates to dispersions of finely powdered plastics in water or organic liquids for use in the formation of sealing gaskets for container closures.

Various methods and materials for the formation of sealing gaskets for container closures are known. For example, plastisols have been widely used to provide a gasket bead in container closures. A plastisol is a mixture of resin particles and a solvent for the particles. The solvent actually forms part of the plastic system. U.S. Pat. No. 2,663,909 to Maier et al describes a typical method for the use of plastisols for formation of sealing gaskets for container closures.

U.S. Pat. No. 3,125,459 to Foye describes another method for forming sealing gaskets in container closures. In the method of the Foye patent, a composition containing an aqueous dispersion of an elastomeric polymer is deposited on a cap. The cap is then subjected to an elevated temperature for a period of time not exceeding ten minutes to drive off the water. The composition and rate of drying is such that a residue of elastomeric polymer containing a multiplicity of interconnected cells and having an open porous surface is left behind. The residual material which is left behind on the cap is not a solid mass, but has a porous, spongy structure. The spongy mass is then converted into a solid coherent sealing gasket by the application of pressure.

Gaskets deposited from solvent-dispersed resin particles are subject to variation in both width and thickness. Gaskets of this type, furthermore, require a substantial time for drying or curing. Those gasketing compositions which require pressure to form the gasket from a spongy mass left after drying have also not been wholly desirable in that pressure forming is an additional step in the container closure manufacture and adds cost to the manufacturing process.

Accordingly, it is a principal object of the present invention to provide an improved gasket composition for the formation of sealing gaskets on container closures.

It is another object of the present invention to provide a fluid dispersion of a thermoplastic resin in a fluid carrier which can be used to form a sealing gasket on container closures.

It is a further object of the present invention to provide a thermoplastic resin in a carrier which is suitable for the formation of sealing gaskets for container enclosures and which does not produce a spongy mass when the carrier is removed by drying or other means.

These and other objects of the present invention will become more apparent from the following detailed description.

In general, the present invention is directed to a method for forming a gasket for a container closure. In the method, a dispersion of a finely powdered plastic resin in a fluid carrier is prepared. The viscosity of the dispersion is adjusted to provide desirable flow characteristics. An annulus of the dispersion is applied to a container closure. The desposited annulus of the dispersion is then subjected to an elevated temperature for a sufficient time to remove the carrier and to fuse the thermoplastic resin particles which are united to form a resilient seal. Removal of the carrier does not result in providing a spongy structure in the thermoplastic resin particles left behind and there is no need for compression of the annulus to provide desired sealing characteristics for the thermoplastic resin annulus.

The finely powdered resin used in the dispersion of the present invention can be any thermoplastic addition polymer which can be finely ground or otherwise provided in particulate form and which can be cured into a fused mass by treatment at an elevated temperature. It this connection, it is preferred that the powdered resin should be capable of being cured at a temperature of from about 170° C. to about 210° C. in a period of from about 3 to about 5 minutes. Preferred resins for use in the gasketing compositions of the present invention are polyolefin resins and polyolefin resins copolymerized with vinyl acetate. Most preferred is polyethylene and ethylene vinyl acetate copolymer having from about 18 to about 33 percent by weight of vinyl acetate monomer. Suitable resins are available commercially in powdered form. The harder resins can be combined with a plasticizer, such as phthalic acid esters, prior to forming into a particulate form.

The powdered resin used in the gasketing composition of the present invention must have a particle size of less than about 50 microns and preferably should have a particle size within the range of from about 5 to about 20 microns. Preferably, the resin is cured to fuse the resin particles at a temperature of from about 170° C. to 210° C. for a period of from about 3 to about 5 minutes.

After curing it is preferred that the fused resin have a density of from about 0.50 to about 0.95 gm/cc. If the density is too high a density reducing agent can be added to the gasketing composition at a level effective to reduce the density to within the indicated range. Suitable density reducing agents include but are not limited to diazocarbamides, hydrazides, carbazides and nitroso compounds. Diazocarbamides are preferred. If used, the density reducing agent is present in the gasket composition at a level of from about 0.1 to about 2.0 percent by weight.

The carrier can be water or any organic fluid which does not react with the powdered resin. Water is preferred for reasons of economy and availability. Suitable organic fluids are mineral spirits, methanol, and toluene. In some instances, organic fluids are preferred since they are more volatile than water and can be removed more rapidly before or during the curing period. In general, the carrier is removed from the gasketing composition by subjecting the container closure to an intermediate temperature of from about 75° C. to about 125° C. for a period of from about 2 to about 5 minutes after the gasketing composition has been deposited on a container closure. The gasketing composition is then subjected to a higher elevated temperature during the curing period. p The powdered resin is present at a level of from about 55 to about 80 percent by weight of the uncured gasketing composition. The carrier is present at a level of from about 20 to about 40 percent.

The powdered resin and carrier alone in combination do not provide desired flow characteristics for application of the gasketing composition to a container closure. In this connection, it is preferred to use a viscosity modifying agent to provide the gasketing composition with a viscosity of from about 40,000 to about 135,000 cps. The choice of a viscosity modification agent is not critical and any of the various viscosity modification agents known in the industry can be used. Particularly preferred viscosity modification agents are natural polysaccharides which are used in the food industry and other natural and synthetic gums which have been qualified for food use. Particularly preferred viscosity modification agents are hydroxypropyl cellulose (manufactured by Hercules, Inc. and sold under the trademark Klucel), carboxy polymethylene polymers (manufactured by B. F. Goodrich Chemical Co. and sold under the trademark Carbopol), and fumed silica (manufactured by Cabot Corp. and sold under the trade mark Cab-O-Sil). The viscosity modification agent is used at a level of from about 1 to about 3 percent by weight of the gasket composition.

A surfactant can be used in the gasket composition to lower surface tension and to provide a more readily flowable composition. The surfactant if used, is used at a level of from about 0.2 to about 0.6 percent by weight of the composition.

The gasket composition of the present invention can be applied to container closures by any suitable method. The composition can be extruded in an annular shape directly onto the container closure. An alternate method is to deposit a mound of material onto the container closure and to form the mound into the desired gasket shape. Thereafter, the deposited gasket material, whether extruded or deposited and formed, is subjected to an elevated temperature as described hereinabove so as to cure the powdered resin.

The following example further illustrates various features of the present invention, but is intended to in no way limit the scope of the invention which is defined in the appended claims.

EXAMPLE

A gasket composition having the following ingredients at the indicated levels is prepared.

| Ingredient | Parts by Weight |
| --- | --- |
| Polyethylene (Microethene FN-500; manufactured by U. S. Industrial Corp. and having a particle size of less than 20 microns). | 100 |
| Water | 40 |
| Surfactant (IGEPAL 630; manufactured by General Ainline and Film Corp.) | 0.4 |
| Viscosity modification agent (10 w/o aqueous KLUCEL G; manufactured by Hercules Corp.) | 20 |
| Defoamer (Dow 200 Silicone manufactured by Dow Corning Co.) | 10 drops |

The gasket composition was prepared by adding the powdered polyethylene resin to an aqueous dispersion containing the surfactant and viscosity modification agent as the dispersion is being stirred. Prior to addition of the polyethylene resin, the defoamer is added to the dispersion. The resultant gasket composition has a viscosity of 45,000 cps.

The gasket composition was extruded through a nozzle onto the surface of a series of metal caps to provide annular rings around the edge of the caps. The caps were placed in an oven at 100° C. for about 3 minutes and were then transferred to an oven at 195° C. for 3 minutes. The caps were then withdrawn and cooled to room temperature. The carrier was found to be completely removed from the gasket composition and the polyethylene resin was cured into a dense resilant mass suitable for use as a gasket for container closures, without any further treatment steps.

What is claimed is:

1. A method of making a gasket for a container closure comprising providing a dispersion consisting essentially of a powdered resin in a carrier, said powdered resin being selected from polyolefin resins and polyolefin resins copolymerized with vinyl acetate and said resin having a particle size of less than about 50 microns, said carrier being non-reactive with said powdered resin, said dispersion having a viscosity in the range of from about 40,000 to about 135,000 cps, applying said dispersion onto the internal surface of a container closure to provide an annulus of said dispersion on said closure, removing said carrier from said annulus, heating said annulus to an elevated temperature to fuse said powdered resin and form a resilient gasket seal from said powdered resin, said fused resilient gasket seal having a density of from about 0.50 to about 0.95 gm/cc.

2. A method in accordance with claim 1, wherein said elevated temperature is from about 170° C. to about 210° C.

3. A method in accordance with claim 1, wherein said resin is selected from polyethylene and ethylene vinyl acetate copolymer.

4. A method in accordance with claim 1, wherein said powdered resin is present in said dispersion at a level of from about 55 to about 80 percent by weight of said dispersion and said carrier is present at a level of from about 20 to about 40 percent by weight of said dispersion.

5. A method in accordance with claim 1, wherein said resin has a particle size in the range of from about 5 to about 20 microns.

6. A method in accordance with claim 1 wherein said dispersion also includes a viscosity modifying agent.

7. A method in accordance with claim 6 wherein said dispersion also includes a surfactant.

8. A method in accordance with claim 6 wherein said dispersion also includes a density reducing agent.

9. A method in accordance with claim 7 wherein said dispersion also includes a density reducing agent.

* * * * *